US007139259B2

(12) United States Patent  (10) Patent No.: US 7,139,259 B2
Qu et al.  (45) Date of Patent: Nov. 21, 2006

(54) METHOD AND APPARATUS FOR CONVEYING REPORTS FOR SMS MESSAGES IN WIRELESS COMMUNICATION SYSTEMS

(75) Inventors: Hai Qu, San Diego, CA (US); Nobuyuki Uchida, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 559 days.

(21) Appl. No.: 10/192,049

(22) Filed: Jul. 9, 2002

(65) Prior Publication Data

US 2004/0008656 A1    Jan. 15, 2004

(51) Int. Cl.
*H04B 7/216* (2006.01)
(52) U.S. Cl. ............... 370/342; 370/335; 455/466
(58) Field of Classification Search ............ 370/342, 370/335, 441, 479, 465, 466, 467, 522; 455/466
See application file for complete search history.

(56) References Cited

U.S. PATENT DOCUMENTS

| 6,097,961 | A  | * | 8/2000  | Alanara et al. | ......... 455/466 |
| 2002/0112014 | A1 | * | 8/2002  | Bennett et al. | ......... 709/206 |
| 2002/0184391 | A1 | * | 12/2002 | Garland        | ......... 709/248 |
| 2004/0053629 | A1 | * | 3/2004  | Rueger et al.  | ......... 455/466 |

FOREIGN PATENT DOCUMENTS

| WO | 01/56311 A1   | 8/2001 |
| WO | 02/05580 A1   | 1/2002 |
| WO | 02/09460 A1   | 1/2002 |

OTHER PUBLICATIONS

3rd Generation Partnership Project: "Technical Realization of the Short Message Service (SMS);" ETSI TS 123 040 V4.4.0, Sep. 2001, pp. 1-130, paragraphs 3.1, 9.2.2.1, 9.2.2.1a, 9.2.2.2, 9.2.2.2a, 9.2.2.3.

* cited by examiner

*Primary Examiner*—Brian Nguyen
(74) *Attorney, Agent, or Firm*—Philip Wadsworth; Sandra L. Godsey; Kent D. Baker (57) ABSTRACT

Techniques for conveying reports for SMS messages in wireless communication networks that utilize CDMA air interface (e.g., GSM1x and CDMA networks). Two new messages SMS Deliver Report Message and SMS Submit Report Message are defined for CDMA SMS. These report messages may be used to more fully convey the information in the SMS-Deliver-Report TPDU and SMS-Submit-Report TPDU defined in GSM SMS. A new Report_Req field is also provided in the Reply Option subparameter of the SMS Deliver Message and SMS Submit Message defined in CDMA SMS. This new field may be used to request a report for an SMS message to be sent by the message's recipient. Each report message may include (1) a first value indicative of whether the SMS message was received correctly or in error, (2) a second value indicative of a type of error, if any, encountered for the SMS message, and (3) user data.

26 Claims, 8 Drawing Sheets

METHOD AND APPARATUS FOR CONVEYING REPORTS FOR SMS MESSAGES IN WIRELESS COMMUNICATION SYSTEMS

BACKGROUND

1. Field

The present invention relates generally to wireless messaging communication, and more specifically to techniques for conveying reports for short messages in wireless communication systems.

2. Background

Short Message Service (SMS) is a service that supports the exchange of SMS or short messages between mobile stations and a wireless communication system. These short messages may be user-specific messages intended for specific recipient mobile stations or broadcast messages intended for multiple mobile stations.

SMS may be implemented by various types of wireless communication systems, two of which are code division multiple access (CDMA) systems and time division multiple access (TDMA) systems. A CDMA network may be designed to implement one or more standards such as cdma2000, W-CDMA, IS-95, and so on. A TDMA network may also be designed to implement one or more standards such as Global System for Mobile Communications (GSM). Each network typically further implements a particular mobile networking protocol that allows for roaming and advanced services, with ANSI-41 being commonly used for CDMA networks (except for W-CDMA) and GSM Mobile Application Part (GSM-MAP) being used for GSM and W-CDMA networks. A network may also implement a combination of different technologies. For example, a GSM1x network is a GSM-MAP network that utilizes a CDMA air interface.

Since SMS is network technology dependent (ANSI-41 or MAP), CDMA and GSM networks that implement different network technologies support different implementations of SMS. Each SMS implementation has different capabilities and utilizes different message types and formats for sending short messages. For simplicity, the SMS implementation for GSM-MAP based networks is referred to as GSM SMS, and the SMS implementation for ANSI-41 based networks is referred to as CDMA SMS.

In certain instances, it is necessary to convert GSM SMS messages to CDMA SMS messages and vice versa. This may be the case, for example, in a GSM1x network whereby GSM SMS messages are exchanged between GSM1x mobile stations and the network using CDMA SMS messages. The message conversion is also needed to support roaming between CDMA and GSM networks.

Since GSM SMS and CDMA SMS support different message types and formats, it may not be possible under the current standards for CDMA SMS and GSM SMS to send certain types of information. This is because some of the message types available in one SMS implementation are not defined in the other SMS implementation. As an example, when the GSM network sends an SMS message to a GSM1x mobile station via the CDMA air interface, the network expects an SMS-Deliver-Report TPDU (Transfer Protocol Data Unit) to be sent by the mobile station. This TPDU contains a report for the SMS message sent to the mobile station. The report may contain information such as (1) whether the message was received correctly or in error, (2) the error type, if applicable, and (3) user data. In the current standard for CDMA SMS, when the mobile station receives an SMS message, it can send a (Transport Layer) SMS Acknowledge Message to the network and may optionally send a (Teleservice Layer) SMS User Acknowledgment Message to the original sender of the received SMS message. The SMS Acknowledge Message cannot carry user data and the SMS User Acknowledgment Message can carry user data but requires a manual acknowledgment by the user. Thus, there is currently no mechanism in CDMA SMS for automatically sending information similar to that included in the GSM SMS-Deliver-Report TPDU, especially if the TPDU is supposed to carry user data.

There is therefore a need in the art for techniques to convey reports for short messages such that the problems described above are ameliorated.

SUMMARY

Techniques are provided herein for conveying reports for SMS messages in wireless communication networks that utilize CDMA air interface (e.g., GSM1x and CDMA networks). In an aspect, two new messages SMS Deliver Report Message and SMS Submit Report Message are defined for an SMS Teleservice Layer in CDMA SMS. These messages may be used to more fully convey the information in the SMS-Deliver-Report TPDU and SMS-Submit-Report TPDU defined in GSM SMS. A new Report_Req field is also provided in the Reply Option subparameter of the SMS Deliver Message and SMS Submit Message defined in CDMA SMS. This new field may be used to request a report for an SMS message to be sent by the recipient of the SMS message.

In an embodiment, a method is provided for conveying reports for short messages in a wireless communication network that utilizes a CDMA air interface (e.g., a GSM1x network or a CDMA network). In accordance with the method, a first short message having included therein a request for a report for the first short message is initially received. A second short message having included therein the report for the first short message is then generated and sent.

The first short message may be an SMS Deliver Message and the second short message may be an SMS Deliver Report Message, if the method is performed at a mobile station. In this case, the network can derive an SMS-Deliver-Report TPDU based on the SMS Deliver Report Message. The first short message may also be an SMS Submit Message and the second short message may be an SMS Submit Report Message, if the method is performed at the network. In this case, the SMS Submit Report Message can be derived from an SMS-Submit-Report TPDU.

In any case, the report may include (1) a first value (e.g., Success) indicative of whether the first short message was received correctly or in error, (2) a second value (e.g., TP-Failure Cause) indicative of a type of error, if any, encountered for the first short message, (3) user data, or (4) any combination thereof.

Various aspects and embodiments of the invention are described in further detail below. The invention further provides methods, program codes, digital signal processors, mobile stations, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
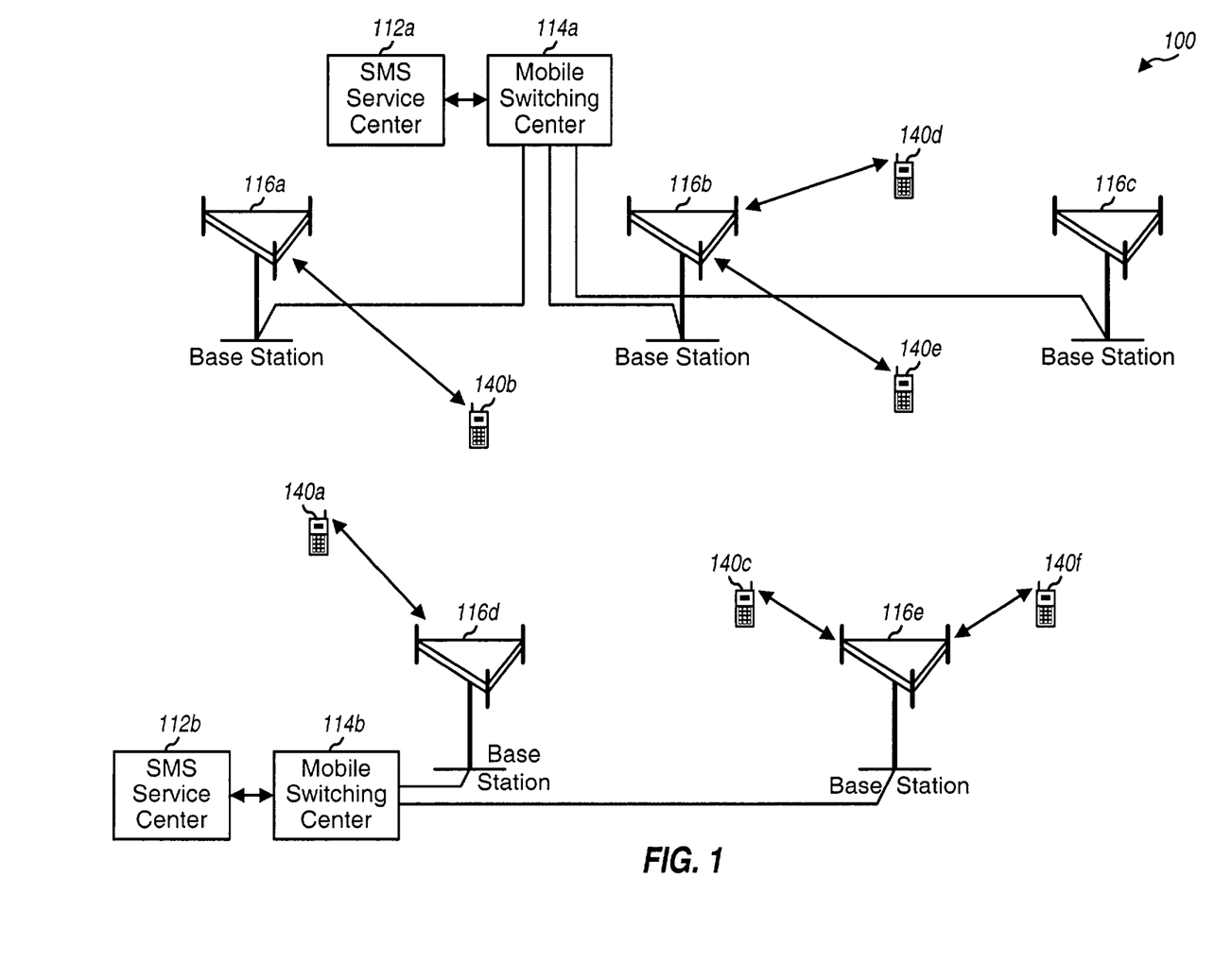
FIG. 1 is a diagram of a wireless communication network that supports SMS.

FIG. 1 is a diagram of a wireless communication network 100 that supports Short Message Service (SMS). Network 100 includes a number of SMS service centers (SMS-SCs) 112, mobile switching centers (MSCs) 114, and base stations 116. The SMS service centers are responsible for storing, relaying, and forwarding short messages for mobile stations 140 within the network. The MSCs perform switching functions (i.e., routing of messages and data) for the mobile stations within their coverage area. The SMS service centers may be implemented separate from or integrated with the MSCs. Each mobile station is served by one MSC at any given moment, and this MSC is referred to as the mobile station's serving MSC. The base stations are fixed stations used for communicating with the mobile stations. A mobile station is also referred to as a remote station, a terminal, user equipment (UE), or some other terminology.

In the embodiment shown in FIG. 1, each SMS service center communicates with a corresponding MSC to support SMS. Each MSC further couples to a number of base stations and controls the communication for the mobile stations under the coverage of these base stations. Each base station communicates with the mobile stations under its coverage area to support SMS and other services (e.g., voice, packet data, and so on). Each mobile station may communicate with one or more base stations at any given moment, depending on whether or not it is active and whether or not soft handoff is supported.

Network 100 may be a CDMA network, a TDMA network, or some other type of network. Network 100 may further implement ANSI-41 or GSM-MAP. Network 100 may also be a GSM1x network that implements GSM-MAP and utilizes CDMA air interface.

SMS is network technology dependent, and two SMS implementations have been defined for ANSI-41 and GSM-MAP. The SMS implementation for GSM-MAP (referred to herein as GSM SMS) is described in detail in 3GPP TS 23.038 V5.0.0 and TS 23.040 V4.7.0. The SMS implementation for ANSI-41 (referred to herein as CDMA SMS) is described in detail in TIA/EIA-637-B, entitled "Short Message Service for Wideband Spread Spectrum Systems." ANSI-41 is described in a TIA/EIA/IS-41-D entitled "Cellular Radio telecommunications Intersystem Operations." These documents are all publicly available and incorporated herein by reference.

For a GSM-MAP based network such as GSM1x, the MSC further functions as a GSM SMS gateway MSC (GSM-SMS-GMSC) and a GSM SMS interworking MSC (GSM-SMS-IWMSC) to support SMS. The GSM-SMS-GMSC is a function of the MSC capable of receiving short messages from the SMS service center, interrogating a home location register (HLR) for routing information and SMS information for each short message, and delivering the short messages to the proper serving nodes (or base stations) for the mobile stations which are the intended recipients of these messages. The GSM-SMS-IWMSC is a function of the MSC capable of receiving short messages and submitting them to the SMS service center.

The techniques described herein for conveying reports for SMS messages may be implemented in various types of network. For example, these techniques may be implemented in a GSM1x network, a CDMA network, and so on. For clarity, various aspects and embodiments are specifically described for a GSM1x network whereby GSM SMS messages are exchanged between the SMS service centers and the mobile stations via the MSCs, and CDMA SMS messages are exchanged between the MSCs and the mobile stations for these GSM SMS messages.

The SMS protocol stack for GSM SMS includes four layers: a Short Message Application Layer (SM-AL), a Short Message Transfer Layer (SM-TL), a Short Message Relay Layer (SM-RL), and Short Message Lower Layers (SM-LL). For GSM SMS, short messages are exchanged in data units referred to as Transfer Protocol Data Units (TPDUs) between the SM-TL at the SMS service center and its peer entity at the mobile stations. The TPDUs are sent by the SMS service center to the MSC and may be encapsulated into protocol elements at the Short Message Relay Layer. For GSM1x, the protocol elements/TPDUs are further converted to the corresponding CDMA SMS messages by the MSC.

The SMS protocol stack for CDMA SMS also includes four layers: an SMS Teleservice Layer, an SMS Transport Layer, an SMS Relay Layer, and a Link Layer.

Figure 2A:
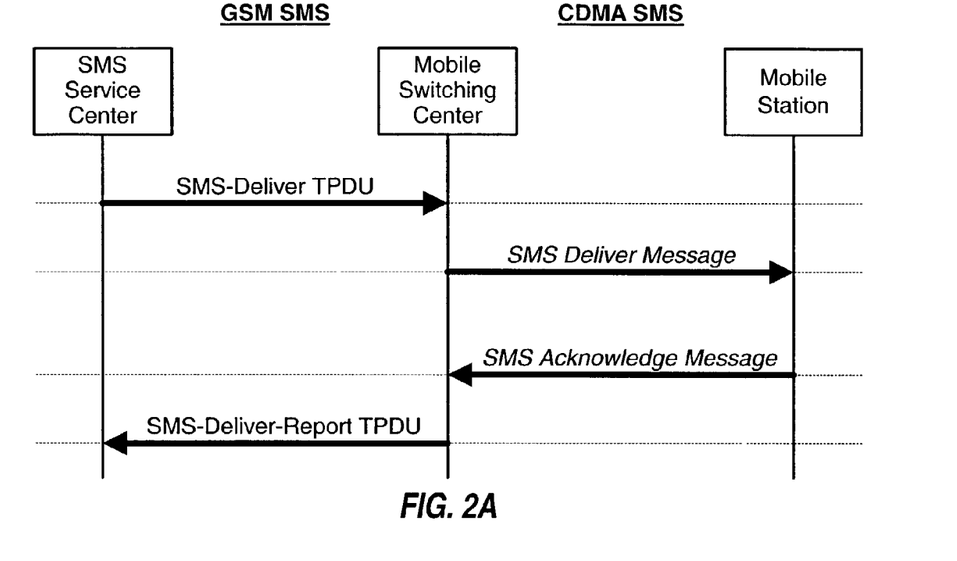
FIGS. 2A and 2B are diagrams illustrating the signal flows for sending an SMS message from an SMS service center to a mobile station, and vice versa.

FIG. 2A is a diagram illustrating the signal flow for sending an SMS message from an SMS service center to a mobile station in a GSM1x network using messages currently defined by GSM SMS and CDMA SMS. For simplicity, FIG. 2A shows the underlying data units and messages being exchanged between the network entities and the mobile station.

Initially, the SMS service center sends an SMS message to a GSM1x mobile station by providing an SMS-Deliver TPDU to the mobile station's serving MSC. The GSM-SMS-GMSC function within the MSC converts this SMS-Deliver TPDU into a (Teleservice Layer) SMS Deliver Message. This message is then provided to the mobile station's serving base station, which transmits the message over-the-air to the mobile station.

In response to receiving the SMS Deliver Message, the mobile station may send a (Transport Layer) SMS Acknowledge Message to the network. The mobile station may optionally send a (Teleservice Layer) SMS User Acknowledgment Message to the original sender of the received SMS message. The SMS Acknowledge Message and/or SMS User Acknowledgment Message sent by the mobile station are received by the serving base station and provided to the MSC. The MSC then converts these messages to an SMS-Deliver-Report TPDU, which is then forwarded to the SMS service center.

The SMS Acknowledge Message does not convey some of the pertinent information that may be included in the SMS-Deliver-Report TPDU. This is especially true if the SMS-Deliver-Report TPDU is supposed to carry user data. The SMS User Acknowledgment Message can carry user data but requires a manual acknowledgment by the user.

Figure 2B:
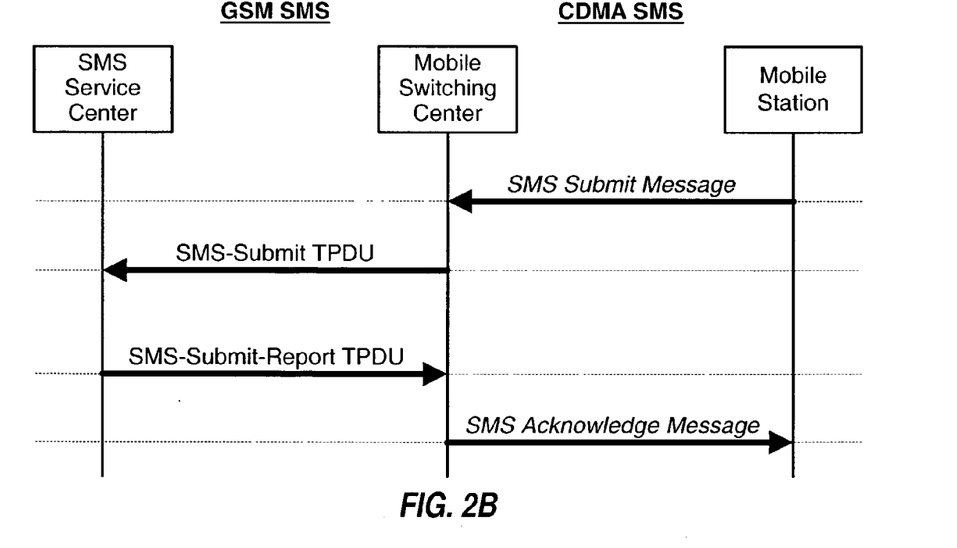

FIG. 2B is a diagram illustrating the signal flow for sending an SMS message from the mobile station to the SMS service center in the GSM1x network using currently defined messages.

Initially, the mobile station originates an SMS message by sending a (Teleservice Layer) SMS Submit Message to the serving base station, which receives the message and forwards it to the MSC. The GSM-SMS-GMSC function within the MSC then converts the SMS Submit Message to an SMS-Submit TPDU, which is then forwarded to the SMS service center.

In response to receiving the SMS-Submit TPDU, the SMS service center can send an SMS-Submit-Report TPDU, which carries the results for the just-received SMS-Submit TPDU. The MSC then converts the SMS-Submit-Report TPDU to a (Transport Layer) SMS Acknowledge Message, which is then sent to the mobile station. Again, the SMS Acknowledge Message does not convey some of the pertinent information that may be included in the SMS-Submit-Report TPDU from the SMS service center. An optional (Teleservice Layer) SMS Delivery Acknowledgment Message may also be sent to the mobile station.

Figure 3A:
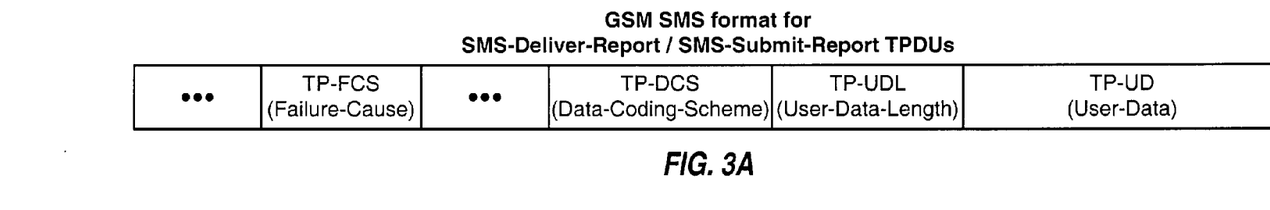
FIG. 3A is a diagram illustrating a format defined by GSM SMS for the SMS-Deliver-Report TPDU and SMS-Submit-Report TPDU.

FIG. 3A is a diagram illustrating a format defined by GSM SMS for the SMS-Deliver-Report TPDU and SMS-Submit-Report TPDU. GSM SMS defines six different TPDUs at the Short Message Transfer Layer (SM-TL) to support SMS. Of these, the SMS-Deliver-Report TPDU is used to send a report from the mobile station to the SMS service center for an SMS message that has been received by the mobile station. Correspondingly, the SMS-Submit-Report TPDU is used to send a report from the SMS service center to the mobile station for an SMS message received by the service center. The other TPDUs are used to exchange short messages, status, and command between the mobile station and the service center.

The SMS-Deliver-Report and SMS-Submit-Report TPDUs have the general format shown in FIG. 3A. (The SMS-Submit-Report TPDU can have an additional field that is not shown in FIG. 3A.) Each of these two TPDUs includes a number of fields, but only four fields of particular interest in the present application are shown in FIG. 3A. Table 1 lists these four fields and their short descriptions, where TP denotes Transfer Protocol.

TABLE 1

| Abbr. | Full Name | Length | Description |
|---|---|---|---|
| TP-FCS | TP-Failure-Cause | 8 bits | Indicate the reason for failure in the corresponding SMS-Deliver or SMS-Submit TPDU. |

TABLE 1-continued

| Abbr. | Full Name | Length | Description |
|---|---|---|---|
| TP-DCS | TP-Data-Coding-Scheme | 8 bits | Identify the coding scheme within the TP-User-Data. |
| TP-UDL | TP-User-Data-Length | 8 bits | Indicate the length of the TP-User-Data. |
| TP-UD | TP-User-Data | variable | User data for the short message. |

The SMS-Deliver-Report TPDU and SMS-Submit-Report TPDU are respectively sent for the SMS-Deliver TPDU and SMS-Submit TPDU that have been received. Each report TPDU may carry an error code in the TP-FCS field that indicates the reason for the failure, if any, to transfer or process the received TPDU. TP-FCS field is included in a report if an error was encountered for the SMS message being acknowledged, and is not included otherwise. The absence or presence of the TP-FCS field may thus be used to differentiate between success or failure. The TP-User-Data field contains the user data for the short message. This user data is typically an alpha-numeric message generated based on a particular character set or coding scheme, but may also contain multimedia and other enhanced formats. The length of the TP-User-Data field is defined by the value in the TP-User-Data-Length field. The TP-Data-Coding-Scheme field indicates various attributes of the data in the TP-User-Data field.

The formats for the SMS-Deliver-Report TPDU and SMS-Submit-Report TPDU are described in further detail in TS 23.040 V4.7.0.

Figure 3B:
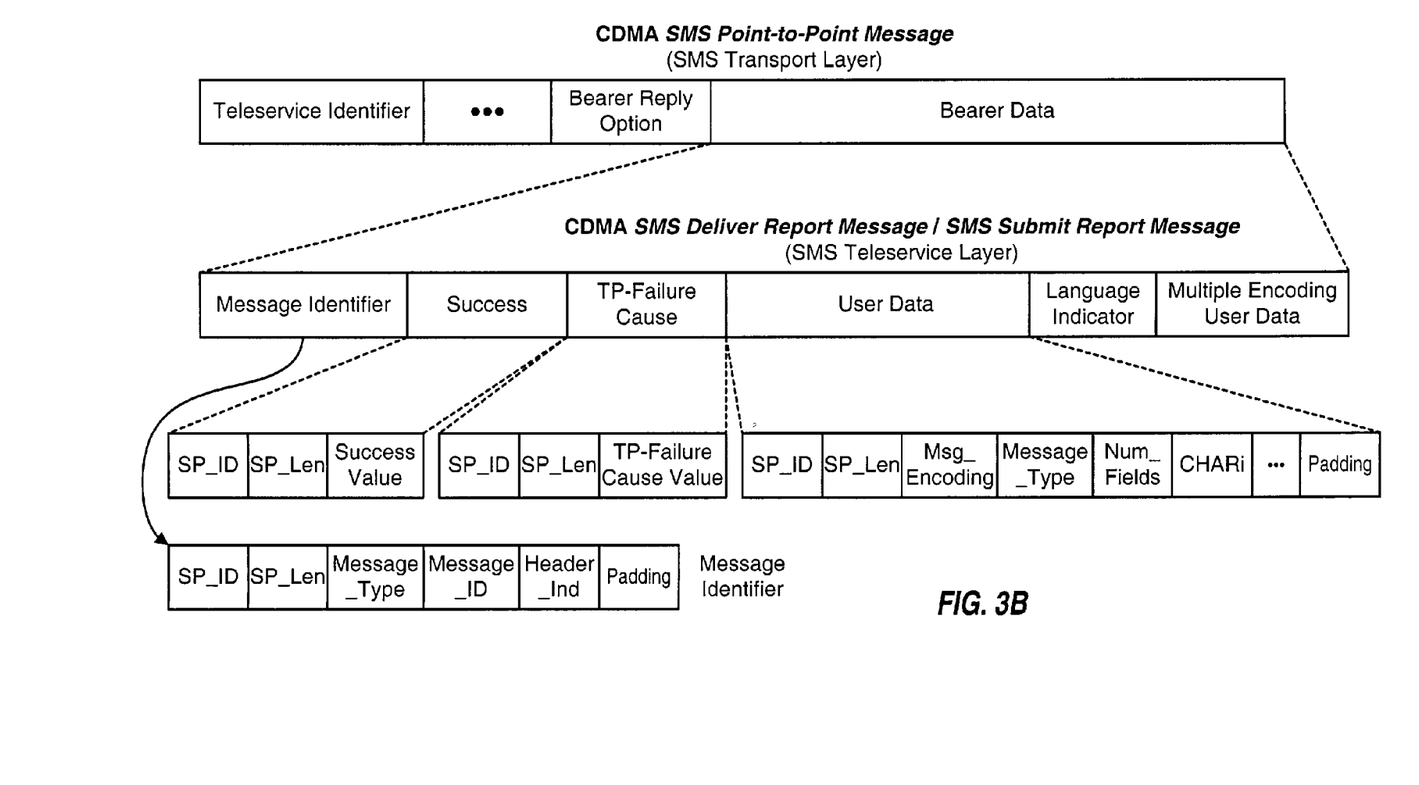
FIG. 3B is a diagram illustrating a format for the SMS Deliver Report Message and SMS Submit Report Message.

FIG. 3B is a diagram illustrating an embodiment of a message format for an SMS Deliver Report Message and an SMS Submit Report Message. These are two newly defined Teleservice Layer messages that may be used to more fully convey the information in the SMS-Deliver-Report TPDU and SMS-Submit-Report TPDU. The SMS Deliver Report Message and SMS Submit Report Message have the general format shown in FIG. 3B, which includes a number of subparameters. Table 2 lists the subparameters for these messages and their short descriptions.

TABLE 2

| Subparameter | Length | Description |
|---|---|---|
| Message Identifier | 5 bytes | Include the message type and a message identification that may be used for acknowledgment. |
| Success | 3 bytes | Indicate whether the SMS Deliver Message/SMS Submit Message was received successfully or in error. |
| TP-Failure Cause | 3 bytes | Indicate the reason for failure in the SMS Deliver Message/SMS Submit Message if it was received in error. |
| User Data | variable | Include various attributes for the user data in the short message as well as the user data itself. |
| Language Indicator | 3 bytes | Indicate the language associated with the user data in the message. |
| Multiple Encoding User Data | variable | Include user data that may be encoded using multiple coding schemes. |

For the SMS Deliver Report Message and SMS Submit Report Message, the Message Identifier and Success subparameters may be defined as mandatory and the remaining subparameters may be made optional. The TP-Failure Cause subparameter may be made mandatory if the Success subparameter has a value of "False" (i.e., the error type only needs to be sent if there was an error).

As shown in FIG. 3B, the Message Identifier subparameter includes a number of fields, one of which is the Message_Type field that identifies the SMS message type. TIA/EIA-637-B defines six different message types for the Teleservice Layer, which are assigned Message_Type values of "0001" through "0110". The Message_Type value of "0111" may be assigned to an SMS Memory Available Notification Message. Two new message types may be defined for the SMS Deliver Report Message and SMS Submit Report Message. In a specific implementation, these two new message types are assigned values of "1000" and "1001", as shown in Table 3.

TABLE 3

| Message-Type | Message Name | Description |
|---|---|---|
| . | . | . |
| . | . | . |
| . | . | . |
| "1000" | SMS Deliver Report Message | Used to send a report for an SMS message received by the mobile station (mobile-originated only). |
| "1001" | SMS Submit Report Message | Used to send a report for an SMS message received from the mobile station (mobile-terminated only). |
| | All other values are reserved | |

TIA/EIA-637-B also defines 21 subparameters that may be included in SMS Teleservice Layer messages and which are assigned Subparameter_ID (SP_ID) values of "00000000" through "00010100". A new subparameter may be defined for the Success subparameter and may be assigned one of the reserved Subparameter_ID values (e.g., "00010101"). Another new subparameter may be defined for the TP-Failure Cause subparameter and may be assigned another reserved Subparameter_ID value (e.g., "00010110"). Table 4 shows the two new subparameters and their assigned Subparameter_ID values, for a specific implementation.

TABLE 4

| Subparameter | Subparameter_ID value |
|---|---|
| . | . |
| . | . |
| . | . |
| Success (new) | "00010101" |
| TP-Failure Cause (new) | "00010110" |
| all other values are reserved | |

In an embodiment, the Success subparameter is defined to have three fields. Table 5 lists the fields in the Success subparameter, their lengths, and their short description and values (where appropriate).

TABLE 5

| Field | Length (bits) | Description |
|---|---|---|
| Subparameter_ID | 8 | Set to "00010101" for the Success subparameter. |
| Subparam_Len | 8 | Set to "00000001", which is the length (in bytes) of the Success subparameter, not including the Subparameter_ID and Subparam_Len fields. |
| Success Value | 8 | Set to "1" for "True" and "0" for "False". |

In an embodiment, the TP-Failure Cause subparameter is defined to have three fields. Table 6 lists the fields in the TP-Failure Cause subparameter, their lengths, and their short description and values (where appropriate).

TABLE 6

| Field | Length (bits) | Description |
|---|---|---|
| Subparameter_ID | 8 | Set to "00010110" for the TP-Failure Cause subparameter. |
| Subparam_Len | 8 | Set to "00000001". |
| TP-Failure Cause Value | 8 | Set to one of the TP-Failure Cause values defined in 3GPP TS 23.040 V4.7.0. |

Table 7 lists the fields of the User Data subparameter, their lengths, and their short description and values (where appropriate).

TABLE 7

| Field | Length | Description |
|---|---|---|
| Subparameter_ID | 8 bits | Set to "00000001" for the User Data subparameter. |
| Subparam_Len | 8 bits | Indicate the length of the User Data subparameter. |
| Msg_Encoding | 5 bits | Indicate the coding scheme used for the user data in the short message. |
| Message_Type | 0 or 8 bits | Indicate the message type for the short message. May also be used to carry information for the TP-DCS field in the SMS-Deliver-Report and SMS-Submit-Report TPDUs. |
| Num_Fields | 8 bits | Indicate the number of occurrences of the CHARi field, which typically corresponds to the number of characters in the user data. |
| Num_Fields occurrences of the following field: | | |
| CHARi | variable | Occur once for each character in the user data in the short message. |
| The User Data subparameter ends with the following field: | | |
| Padding | 0-7 bits | Include sufficient number of bits to make the User Data subparameter an integer number of octets in length. |

As shown in Table 7, the user data for the SMS Deliver Report Message and SMS Submit Report Message is contained in the CHARi fields, one occurrence of this field for each character, with the total number of occurrences being indicated by the value in the Num_Fields field. The Msg_Encoding field indicates the specific coding scheme used for the characters in the CHARi field. Since different coding schemes can have different character lengths, the length of the CHARi field is determined by the coding scheme used for the user data in the short message.

The TP-DCS field in GSM SMS includes various types of information related to the user data in the TP-UD field, such as whether the user data is compressed or uncompressed, the message class, and other indications. Since there is currently no corresponding field or subparameter in CDMA SMS for the information in the TP-DCS field, this information may be carried in the Message_Type field in the User Data subparameter. A new value (e.g., "01010") may be defined for the Msg_Encoding field to indicate that the Message_Type field contains information for the TP-DCS field. The use of the Message_Type field to carry TP-DCS information is described in further detail in U.S. Patent Application Ser. No. 10/192,134, entitled "Short Message Conversion Between Different Formats for Wireless Communication Systems," filed Jul. 9, 2002, assigned to the assignee of the present application and incorporated herein by reference.

As shown in FIG. 3B, the SMS Deliver Report Message and SMS Submit Report Message may each be carried in a (Transport Layer) SMS Point-to-Point Message defined by CDMA SMS. This Transport Layer message includes a number of parameters including: (1) a Teleservice Identifier parameter that identifies which upper layer service access point is sending or should receive the message, (2) an optional Bearer Reply Option parameter that may be used to request a reply of an SMS Acknowledge Message from the receiver, and (3) other optional parameters.

FIG. 3B shows a specific implementation of the SMS Deliver Report Message and SMS Submit Report Message. Other message formats having fewer, different, and/or additional subparameters and fields may also be defined, and this is within the scope of the invention. For example, these two messages may be defined without the Language Indicator and Multiple Encoding User Data subparameters. As another example, the Success and TP-Failure Cause subparameters may be combined into one subparameter that includes both the Success Value and TP-Failure Cause Value fields. As yet another example, the Success subparameter may be omitted and implicitly interpreted by the presence of the TP-Failure Cause subparameter.

Figure 4:
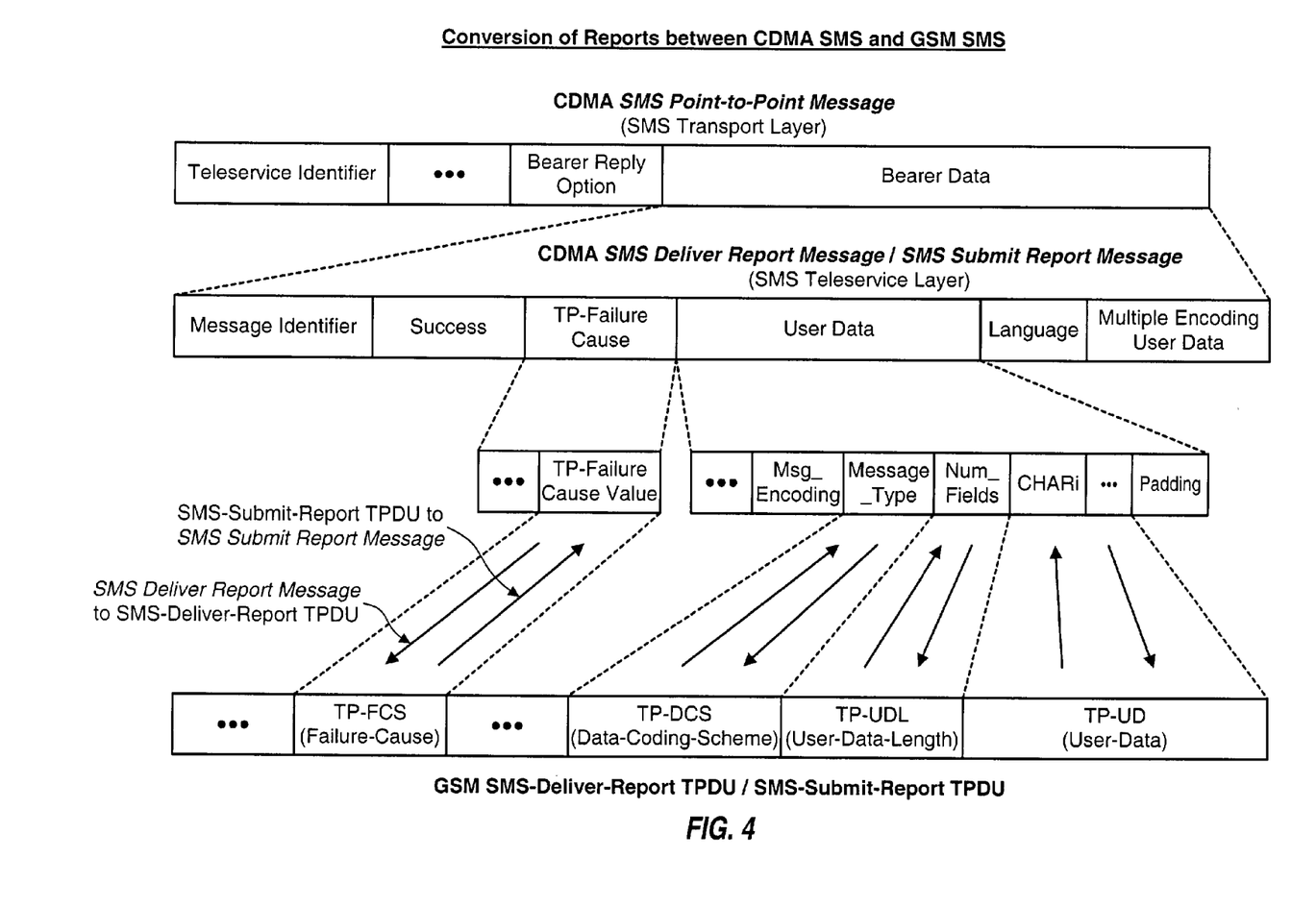
FIG. 4 is a diagram illustrating the conversion between CDMA SMS report messages and GSM SMS report TPDUs.

FIG. 4 is a diagram illustrating the conversion between CDMA SMS report messages and GSM SMS report TPDUs. The conversion of an SMS Deliver Report Message to an SMS-Deliver-Report TPDU may be performed as follows:

1) Set the TP-FCS field in the SMS-Deliver-Report TPDU to the value in the TP-Failure Cause Value field in the TP-Failure Cause subparameter of the SMS Deliver Report Message if the Success subparameter requires it;
2) Set the TP-UD field in the SMS-Deliver-Report TPDU to the data in the CHARi fields in the User Data subparameter of the SMS Deliver Report Message;
3) Set the TP-UDL field in the SMS-Deliver-Report TPDU to the value in the Num_Fields field of the User Data subparameter; and
4) Set the TP-DCS field in the SMS-Deliver-Report TPDU to the value in the Message_Type field of the User Data subparameter.

Correspondingly, the conversion of an SMS-Submit-Report TPDU to an SMS Submit Report Message may be performed as follows:

1) Set the TP-Failure Cause Value field in the TP-Failure Cause subparameter of the SMS Submit Report Message to the value in the TP-FCS field of the SMS-Submit-Report TPDU if the Success subparameter requires it;
2) Set the CHARi fields in the User Data subparameter of the SMS Submit Report Message to the data in the TP-UD field of the SMS-Submit-Report TPDU;
3) Set the Num_Fields field in the User Data subparameter to the value in the TP-UDL field of the SMS-Submit-Report TPDU; and
4) Set the Message_Type field in the User Data subparameter to the value in the TP-DCS field of the SMS-Submit-Report TPDU.

Since the SMS Deliver Report Message and SMS Submit Report Message are new Teleservice Layer messages in CDMA SMS, a mechanism is also provided for the sender of an SMS message to request a report via one of these new messages.

Figure 5:
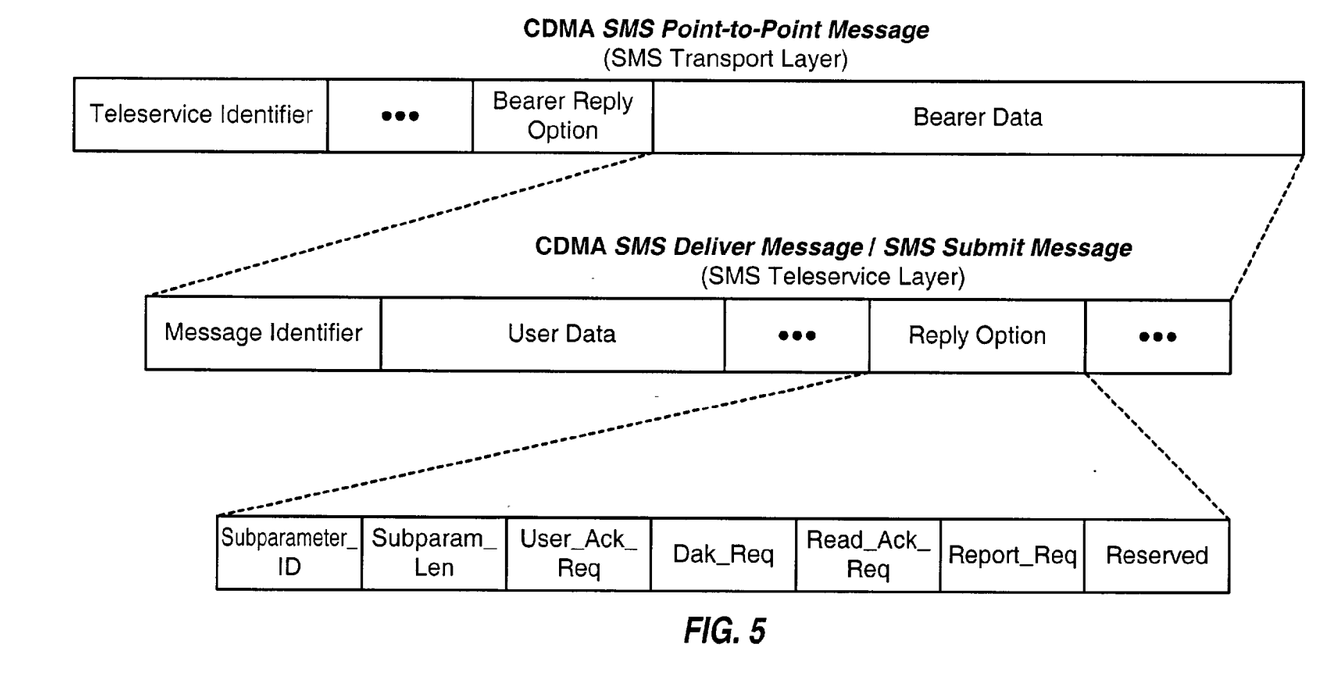
FIG. 5 is a diagram illustrating a format for the SMS Deliver Message and SMS Submit Message with the new Report_Req field.

FIG. 5 is a diagram illustrating an embodiment of a message format for the SMS Deliver Message and SMS Submit Message, both of which are Teleservice Layer messages that include a new field used to request a report for a sent SMS message. The SMS Deliver Message and SMS Submit Message include a number of subparameters, including Message Identifier, User Data, Reply Option, and so on. The Reply Option subparameter includes a number of fields that indicate whether or not acknowledgments of various types are requested.

As currently defined by TIA/EIA-637-B, the Reply Option subparameter includes (1) a User_Ack_Req field that may be set to "True" to request a positive user (manual) acknowledgment of the SMS message, (2) a Dak_Req field that may be set to "True" to request a delivery acknowledgment of the SMS message, and (3) a Read_Ack_Req field that may be set to "True" to request an acknowledgment if the SMS message is viewed. In an embodiment, a new Report_Req field is defined and may be set to "True" to request a report from the receiver. In particular, if the Report_Req field is set to "True" in an SMS Deliver Message, then the mobile station is expected to send an SMS Deliver Report Message to the network. Correspondingly, if the Report_Req field is set to "True" in an SMS Submit Message, then the network is expected to send an SMS Submit Report Message to the mobile station. The new Report_Req field may be defined using one of the bits in the Reserved field.

In an embodiment, for a GSM1x network, the Report_Req field does not need to be set to "True" when an SMS Submit Message is sent by a GSM1x mobile station. This is because the network can automatically enable this field before delivering the message to the receiving mobile station via the CDMA air interface. As an example, consider a scenario where SMS messages are exchanged between two GSM1x mobile stations (MS). When GSM1x MS A sends an SMS Submit Message without the Report_Req field to GSM1x MS B, the MSC receives and converts this message to an SMS-Submit TPDU and forwards it to the GSM-SMS-SC. The GSM-SMS-SC then sends this as an SMS-Deliver TPDU to GSM1x MS B. The MSC receives this TPDU and converts it to an SMS Deliver Message with the Report_Req field and sends it to GSM1x MS B. GSM1x MS B receives the message and sends an SMS Deliver Report Message to the MSC, which then converts it to an SMS-Deliver-Report TPDU and forwards it to the GSM-SMS-SC. In this message exchange, since the GSM1x network is expected to send the SMS-Submit-Report TPDU to the mobile station, it's not necessary to set the Report_Req field in GSM1x network. In an ANSI-41 based CDMA network, the network can enable or disable this field depending on the needs of the network.

Figure 6A:
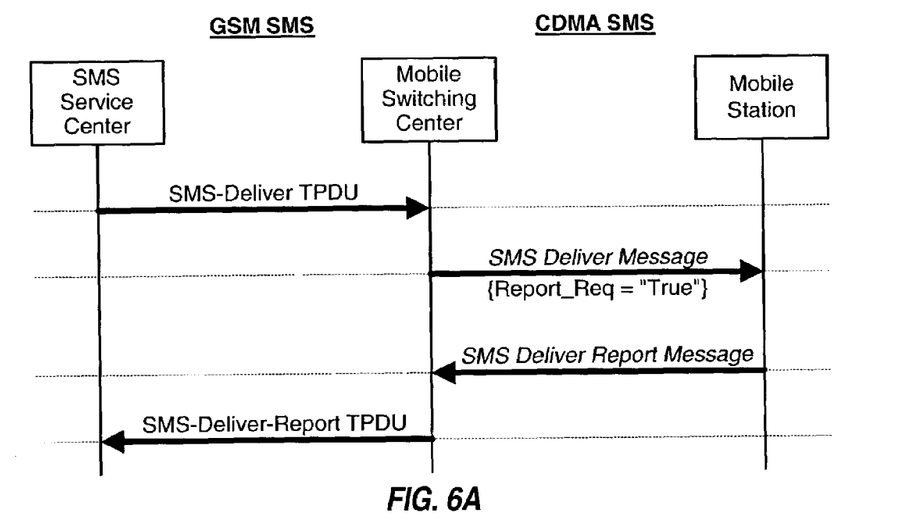
FIGS. 6A and 6B are diagrams illustrating the signal flows for sending an SMS message from the SMS service center to the mobile station, and vice versa, using the SMS Deliver Report Message and SMS Submit Report Message.

FIG. 6A is a diagram illustrating the signal flow for sending an SMS message from the SMS service center to a mobile station in the GSM1x network using the newly defined SMS Deliver Report Message. The signal flow in FIG. 6A is similar to that shown in FIG. 2A, except that the messages exchanged over the CDMA air interface is different. In particular, the MSC converts the SMS-Deliver TPDU for the SMS message into the SMS Deliver Message with the Report_Req field in the Reply Option subparameter set to "True" to request a report from the mobile station. This SMS Deliver Message is then sent over-the-air to the mobile station.

In response to receiving the SMS Deliver Message with the Report_Req field set to "True", the mobile station sends an SMS Deliver Report Message to the network. For GSM SMS, this report needs to be sent within a specified time period of between 12 and 20 seconds, as defined in 3GPP TS 24.011 Section 10. The MSC receives and converts this message to an SMS-Deliver-Report TPDU, which is then forwarded to the SMS service center.

Figure 6B:
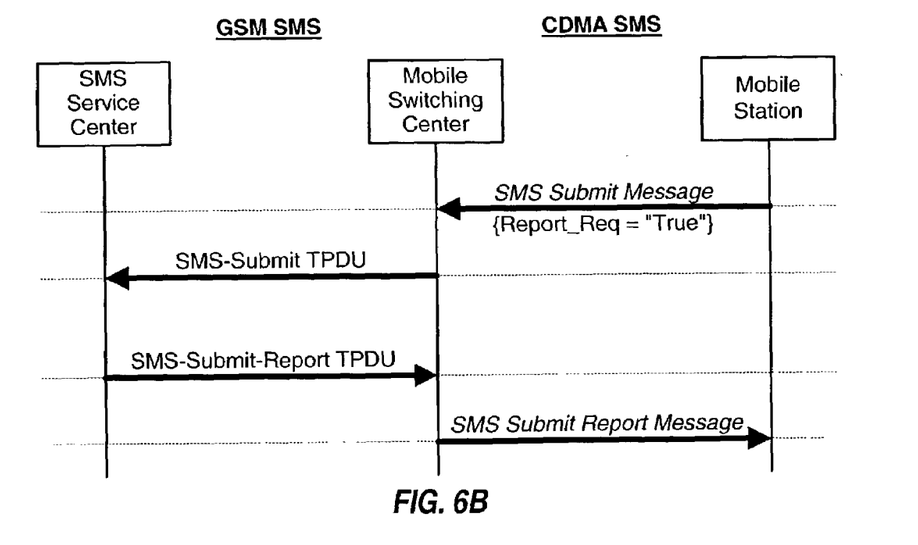

FIG. 6B is a diagram illustrating the signal flow for sending an SMS message from the mobile station to the SMS service center in the GSM1x network using the newly defined SMS Submit Report Message. The signal flow in FIG. 6B is similar to that shown in FIG. 2B, except that the messages exchanged over the CDMA air interface is different. In particular, the mobile station sends to the network an SMS Submit Message with the Report_Req field set to "True".

In response to receiving the SMS-Submit TPDU for the SMS message, the SMS service center originates an SMS-Submit-Report TPDU. The MSC then receives and converts the SMS-Submit-Report TPDU to an SMS Submit Report Message, since the Report_Req field in the original SMS Submit Message was set to "True". The SMS Submit Report Message is then sent over-the-air to the mobile station. For GSM SMS, the network is required to send the SMS Submit Report Message to the mobile station within a specified time period of between 35 and 45 seconds, as defined in 3GPP TS 24.011 Section 10.

Figure 7:
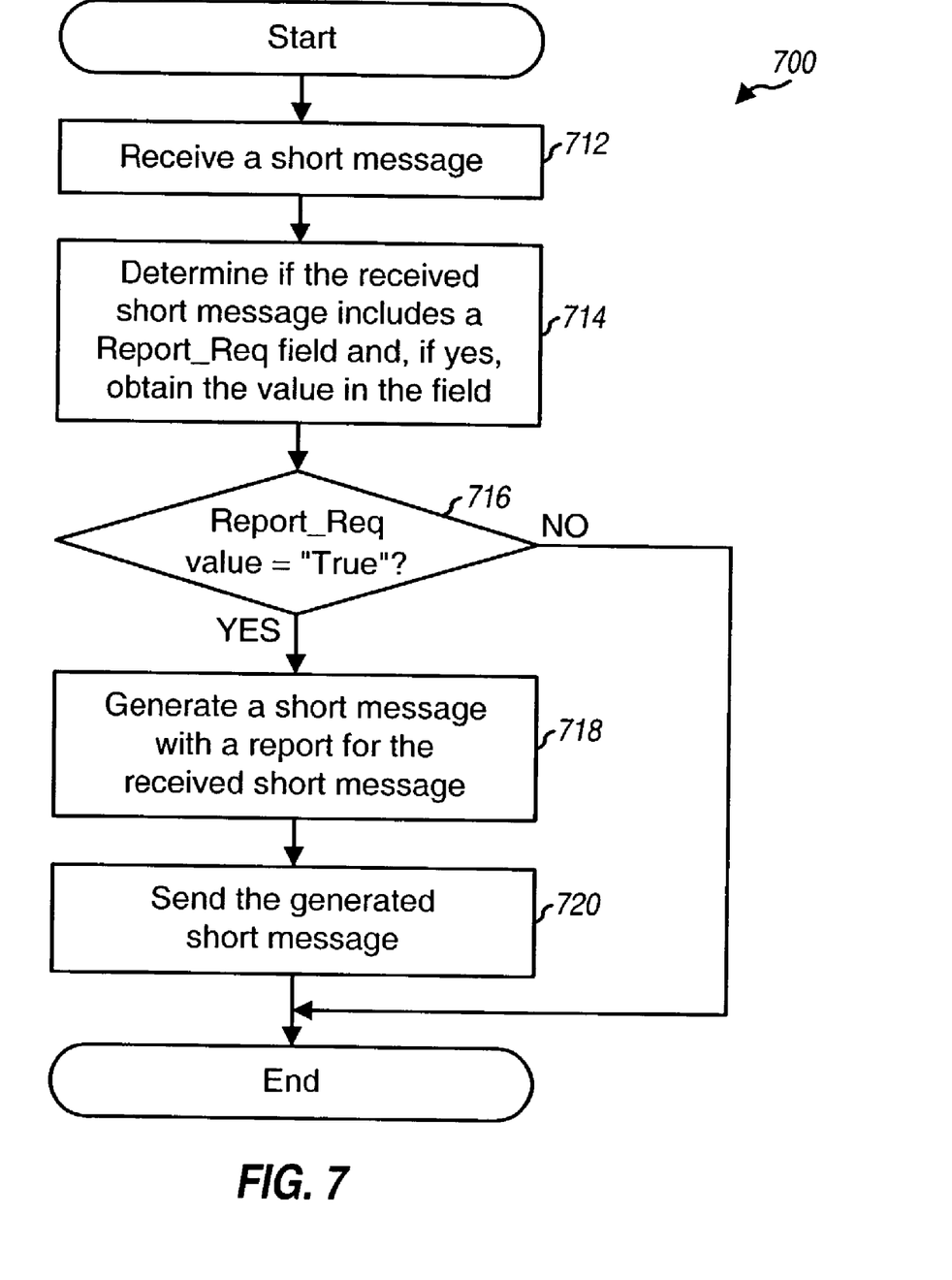
FIG. 7 is a flow diagram of a process to convey reports for SMS messages in a network that utilizes CDMA air interface.

FIG. 7 is a flow diagram of an embodiment of a process 700 to convey reports for SMS messages in a network that utilizes a CDMA air interface (e.g., a GSM1x network). This process may be performed by either the network or the mobile station.

Initially, an incoming SMS message is received (712). This received SMS message may be either (1) an SMS Deliver Message, if the process is being performed by the mobile station or (2) an SMS Submit Message, if the process is being performed by the network. A determination is then made if a Report_Req field is included in the received SMS message and, if yes, then the value of this field is obtained (step 714).

If the Report_Req field is included in the received SMS message and its value is "True", as determined in step 716, then a response SMS message with a report for the received SMS message is generated (step 718). This generated SMS message may be either (1) an SMS Deliver Report Message, if the process is being performed by the mobile station or (2) an SMS Submit Report Message, if the process is being performed by the network. The generated SMS message may include (1) a first value that indicates whether the incoming SMS message was received correctly or in error, (2) a second value that indicates the type of error, if any, encountered for the received SMS message, (3) user data, and so on. The generated SMS message is then sent to the sender of the received SMS message (step 720). The process then terminates.

Back in step 716, if the Report_Req field is not included in the received SMS message or if its value is not "True", then a report does not need to be generated for the received SMS message. Other forms of acknowledgment may or may not be sent for the received SMS message, depending on the Reply Option subparameter in the received SMS message.

These other forms of acknowledgment are not shown in FIG. 7 for simplicity. The process would then terminate if the answer for step 716 is no.

The techniques for conveying reports for SMS messages described herein allow (1) a mobile station to send an SMS message to the network to convey the information in an SMS-Deliver-Report TPDU, and (2) the network to send an SMS message to the mobile station to convey the information in an SMS-Submit-Report TPDU.

These techniques may advantageously be used in a GSM1x network, which utilizes CDMA air interface for communication between the network and the mobile stations instead of GSM air interface. Using these techniques, a GSM1x mobile user in the GSM1x environment can operate very much like a GSM mobile user in a conventional GSM environment and can enjoy the same experience as the GSM mobile user, in terms of receiving SMS message submission status, even though the underlying air interface is CDMA instead of GSM. The GSM1x mobile user will be able to receive SMS-Submit-Report TPDU information when talking to the GSM mobile user and will also be able to send SMS-Deliver-Report TPDU information. Hence, both the GSM1x mobile user and the GSM mobile user will not feel any differences in such an environment.

These techniques may also advantageously be used in an ANSI-41 based CDMA network. For such a "pure" CDMA network, the new report messages represent enhancements to the CDMA SMS features in terms of the ability to carry User Data and other information in these new report messages. In general, the techniques described herein may be used for any network that utilizes a CDMA air interface.

Figure 8:
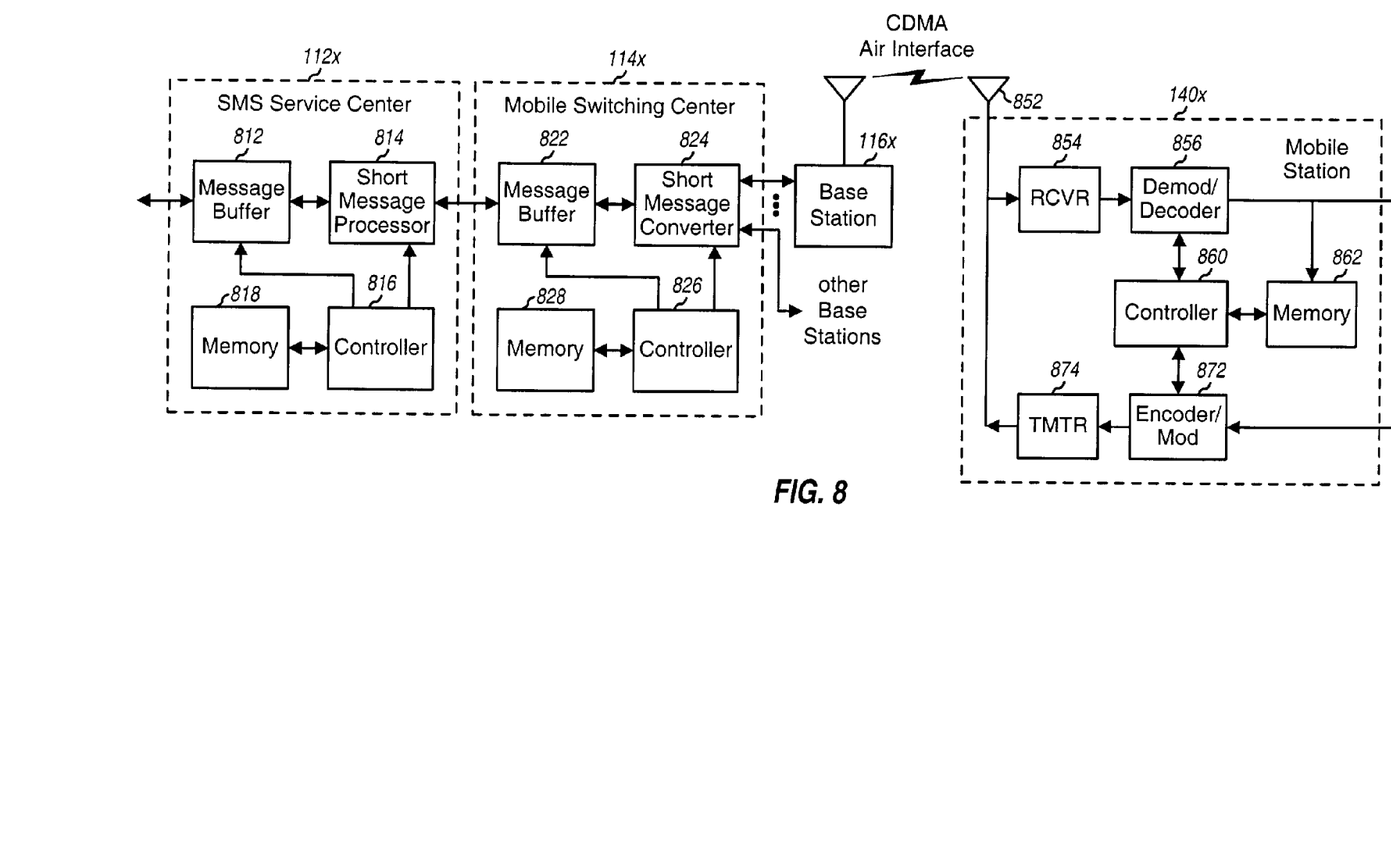
FIG. 8 is a block diagram of an embodiment of the SMS service center, MSC, and mobile station.

FIG. 8 is a block diagram of an embodiment of an SMS service center 112x, an MSC 114x, and a mobile station 140x. For this embodiment, SMS service center 112x supports GSM SMS and MSC 114x performs the conversion for reports between GSM SMS and CDMA SMS.

Within SMS service center 112x, a message buffer 812 stores data for short messages to be exchanged with mobile stations in the network. On the transmit side, a short message processor 814 receives data from buffer 812 and generates GSM SMS messages with the proper type and format. In particular, short message processor 814 generates and provides an SMS-Deliver TPDU for each short message to be sent to a mobile station and an SMS-Submit-Report TPDU for each short message report. On the receive side, short message processor 814 receives an SMS-Deliver-Report TPDU for a short message previously sent to a mobile station and an SMS-Submit TPDU for a short message sent by a mobile station. Short message processor 814 then extracts the pertinent data from these received TPDUs and stores the data in buffer 812. SMS service center 112x exchanges TPDUs with MSC 114x.

Within MSC 114x, a message buffer 822 stores the TPDUs for short messages to be exchanged with the mobile stations in the network. On the transmit side, a short message converter 824 receives TPDUs from buffer 822 and generates the corresponding CDMA SMS messages with the proper type and format. In particular, short message converter 824 provides an SMS Deliver Message for each SMS-Deliver TPDU and an SMS Submit Report Message for each SMS-Submit-Report TPDU. On the receive side, short message converter 824 receives and converts each SMS Deliver Report Message to provide a corresponding SMS-Deliver-Report TPDU and also receives and converts each SMS Submit Message to provide a corresponding SMS-Submit TPDU.

MSC 114x exchanges CDMA SMS messages with base stations 116 currently serving the mobile stations which are the recipients/originators of the messages. On the transmit side, each base station processes the received short messages and includes them in a modulated signal transmitted to the mobile stations within its coverage area.

Within SMS service center 112x, a controller 816 directs the flow of the short messages passed through the service center. Within MSC 114x, a controller 826 directs the conversion of the short messages passed through the MSC. Memory units 818 and 828 provide storage for program codes and data used by controllers 816 and 826, respectively.

FIG. 8 also shows an embodiment of mobile station 140x. On the receive path, the modulated signal transmitted from the mobile station's serving base station is received by an antenna 852 and provided to a receiver unit (RCVR) 854. Receiver unit 854 conditions (e.g., filters, amplifies, and downconverts) the received signal and further digitizes the conditioned signal to provide samples. A demodulator (Demod)/decoder 856 then demodulates the samples (e.g., based on cdma2000 physical layer processing) and further decodes the demodulated data to provide decoded data, which includes the SMS messages sent in the modulated signal. The data for the user-specific and broadcast SMS messages sent to this mobile station is provided as output data and may further be stored in a memory 862.

On the transmit path, data for messages and reports to be sent by the mobile station are provided to an encoder/modulator (Mod) 872, which encodes and modulates the data. The modulated data is then conditioned by a transmitter unit (TMTR) 874 to provide a modulated signal suitable for transmission back to the base station.

A controller 860 directs the operation of the units within mobile station 140x. For example, controller 860 may direct the processing of the SMS Deliver Message and SMS Submit Report Message received from the network and the generation of the SMS Deliver Report Message and SMS Submit Message to be sent to the network. A memory unit 862 provides storage for program codes and data used by controller 860 (e.g., data for SMS messages).

FIG. 8 shows a specific embodiment of SMS service center 112x, MSC 114x, and mobile station 140x. Other embodiments may also be contemplated and are within the scope of the invention. For example, the conversion of reports between GSM SMS and CDMA SMS may be performed by the SMS service center.

The techniques described herein to convey reports for short messages may be implemented by various means. For example, these techniques may be implemented in hardware, software, or a combination thereof. For a hardware implementation, the elements used to implement any one or a combination of the techniques described herein (e.g., process 700) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques to convey reports for short messages may be implemented with modules (e.g., procedures, functions, and so on) that perform the functions described herein. The software codes may be stored in a memory unit (e.g., memory units 818, 828, and 862 in FIG. 8) and executed by a processor (e.g., controllers 816, 826, and 860). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication network of a first type that that utilizes a CDMA air interface, a method of conveying reports for short messages, comprising:

receiving at a mobile station of the wireless communication network of the first type a first short message, the first short message having included therein a request for a report for the first short message, wherein the report includes information used to report receipt of short messages in a network of a second type, the information not used to acknowledge short messages in the wireless communication network of the first type;

sending from the mobile station a second short message having included therein the report for the first short message.

2. The method of claim 1, wherein the first short message is an SMS Deliver Message and the second short message is an SMS Deliver Report Message.

3. The method of claim 2, further comprising:

deriving an SMS-Deliver-Report TPDU (Transfer Protocol Data Unit) based on the SMS Deliver Report Message.

4. The method of claim 1, further comprising:

sending from the mobile station an acknowledgement message for the first short message.

5. The method of claim 1, wherein the report includes a first value indicative of whether the first short message was received correctly or in error.

6. The method of claim 1, wherein the report includes a second value indicative of a type of error, if any, encountered for the first short message.

7. The method of claim 1, wherein the report includes user data.

8. The method of claim 1, wherein the wireless communication network is a GSM1x network.

9. The method of claim 1, wherein the wireless communication network is an ANSI-41 CDMA network, and the network of the second type is a GSM-MAP network.

10. In a first type wireless communication network that utilizes a CDMA air interface, a method of conveying reports for short messages, comprising receiving at a mobile station of the first type wireless communication network an SMS Deliver Message having included therein a request for a report for the SMS Deliver Message;

sending an SMS Deliver Report Message having included therein the report for the SMS Deliver Message, wherein the report includes information used to report receipt of short messages in a network of a second type, the information not used to acknowledge short messages in the wireless communication network of the first type; and sending from the mobile station an acknowledgment message for the SMS Deliver Message.

11. The method of claim 10, wherein the SMS Deliver Report Message includes a first value indicative of whether the SMS Deliver Message was received correctly or in error and a second value indicative of a type of error, if any, encountered for the SMS Deliver Message.

12. A method of conveying reports for short messages in a wireless CDMA communication network of a first type, the method comprising:
sending from a mobile station of the wireless communication network of the first type to a network of a second type an SMS Submit Message having included therein a request for a report for the SMS Submit Message, the report comprising information used to report receipt of short messages in the network of the second type, the information not used to acknowledge short messages in the wireless communication network of the first type; and
receiving an SMS Submit Report Message having included therein the report for the SMS Submit Message.

13. In a first type wireless communication network that utilizes a CDMA air interface, a method of conveying reports for short messages, comprising
sending to a mobile station an SMS Deliver Message having included therein a request for a report for the SMS Deliver Message, wherein the report includes information used to report receipt of short messages in a network of a second type, the information not used to acknowledge short messages in the first type wireless communication network;
receiving from the mobile station an SMS Deliver Report Message having included therein the report for the SMS Deliver Message;
forming an SMS-Deliver-Report TPDU based on the SMS Deliver Report Message; and
receiving an acknowledgment message for the SMS Deliver Message.

14. The method of claim 13, further comprising:
receiving an SMS Submit Message having included therein a request for a report for the SMS Submit Message; and
sending an SMS Submit Report Message generated based on an SMSSubmit-Report TPDU and having included therein the report for the SMS Submit Message.

15. In a wireless communication network of a first type that utilizes a CDMA air interface, an apparatus operable to convey reports for short messages, comprising:
means for receiving at a mobile station of the wireless communication network of the first type a first short message, the first short message having included therein a request for a report for the first short message, wherein the report includes information used to report receipt of short messages in a network of a second type, the information not used to acknowledge short messages in the wireless communication network of the first type;
means for sending from the mobile station a second short message having included therein the report for the first short message; and
means for sending from the mobile station an acknowledgment message for the first short message.

16. The apparatus of claim 15, further comprising:
means for converting the second short message to a corresponding TPDU (Transfer Protocol Data Unit).

17. The apparatus of claim 15, wherein the second short message includes a first value indicative of whether the first short message was received correctly or in error and a second value indicative of a type of error, if any, encountered for the first short message.

18. The apparatus of claim 15, wherein the wireless communication network is a GSM1 x network.

19. The apparatus of claim 15, wherein the wireless communication network is a CDMA network.

20. A method of conveying reports for short messages, the method comprising:
receiving a first short message from a network of a second type;
converting the first short message into a converted first short message for sending in a wireless communication network of a first type, the converted first short message comprising a request for information used to report receipt of short messages in the network of the second type, the information not used to acknowledge short messages in the wireless communication network of the first type;
sending the converted first short message to a mobile station in the wireless communication network of the first type.

21. The method of claim 20, further comprising:
receiving from the mobile station a first network report message comprising the information.

22. The method of claim 21, further comprising:
after receiving the report message, forming a type two network report for the first short message comprising the information, the type two network report for the first short message being of a type used to acknowledge short messages in the network of the second type; and
sending the type two network report.

23. The method of claim 22, wherein:
the wireless communication network of the first type is an ANSI-41 CDMA network; and
the network of the second type is a GSM-MAP network.

24. The method of claim 23, wherein:
the converted first short message comprises an SMS Deliver Message;
the first network report message comprises an SMS Deliver Report Message; and
the type two network report comprises an SMS-Deliver-Report TPDU.

25. The method of claim 22, wherein the steps of receiving the first short message, converting, sending the converted first short message, receiving from the mobile station the first network report message, and sending the type two network report are performed at the mobile switching center.

26. The method of claim 22, further comprising:
receiving from the mobile station an acknowledgement message for the converted first short message, the acknowledgment message being of a type used to acknowledge short messages in the wireless communication network of the first type.

* * * * *

UNITED STATES PATENT AND TRADEMARK OFFICE
CERTIFICATE OF CORRECTION

PATENT NO.         : 7,139,259 B2                                    Page 1 of 1
APPLICATION NO. : 10/192049
DATED              : November 21, 2006
INVENTOR(S)        : Hai Qu and Nobuyuki Uchida It is certified that error appears in the above-identified patent and that said Letters Patent is hereby corrected as shown below:

Title Page item 73 should read
Assignee: QUALCOMM Incorporated

CLAIM 1, line 1 should read: In a wireless network of the first type that utilizes a CDMA air interface…

CLAIM 14 should read. The method of claim 13, further comprising:
  receiving an SMS-Submit Message having included therein a request for a report for the SMS-Submit Message and;
  sending an SMS-Submit Report Message generated based on the SMS-Submit-Report TPDU and having included therein the report for SMS-Submit Message.

Signed and Sealed this

Fourteenth Day of October, 2008

JON W. DUDAS
*Director of the United States Patent and Trademark Office*

UNITED STATES PATENT AND TRADEMARK OFFICE
CERTIFICATE OF CORRECTION

PATENT NO. : 7,139,259 B2  
APPLICATION NO. : 10/192049  
DATED : November 21, 2006  
INVENTOR(S) : Hai Qu and Nobuyuki Uchida Page 1 of 1

It is certified that error appears in the above-identified patent and that said Letters Patent is hereby corrected as shown below:

Title Page item 73 should read  
Assignee: QUALCOMM Incorporated

CLAIM 1, Column 14, line 15 should read: In a wireless network of the first type that utilizes a CDMA air interface…

CLAIM 14, Column 15, lines 38-44 should read: The method of claim 13, further comprising:
    receiving an SMS-Submit Message having included therein a request for a report for the SMS-Submit Message and;
    sending an SMS-Submit Report Message generated based on the SMS-Submit-Report TPDU and having included therein the report for SMS-Submit Message.

This certificate supersedes the Certificate of Correction issued October 14, 2008.

Signed and Sealed this

Fourth Day of November, 2008

JON W. DUDAS  
*Director of the United States Patent and Trademark Office*